United States Patent
Hori et al.

(10) Patent No.: US 11,320,808 B2
(45) Date of Patent: May 3, 2022

(54) PLANT DATA DISPLAY PROCESSING DEVICE AND PLANT CONTROL SYSTEM

(71) Applicant: HITACHI, LTD., Tokyo (JP)

(72) Inventors: Yoshinari Hori, Tokyo (JP); Kouji Kageyama, Tokyo (JP); Hiroki Yamamoto, Tokyo (JP); Masaaki Mukaide, Tokyo (JP)

(73) Assignee: HITACHI, LTD., Tokyo (JP)

( * ) Notice: Subject to any disclaimer, the term of this patent is extended or adjusted under 35 U.S.C. 154(b) by 270 days.

(21) Appl. No.: 16/327,300

(22) PCT Filed: Jun. 16, 2017

(86) PCT No.: PCT/JP2017/022278
§ 371 (c)(1),
(2) Date: Feb. 21, 2019

(87) PCT Pub. No.: WO2018/055853
PCT Pub. Date: Mar. 29, 2018

(65) Prior Publication Data
US 2019/0227531 A1    Jul. 25, 2019

(30) Foreign Application Priority Data
Sep. 20, 2016 (JP) .............................. JP2016-182582

(51) Int. Cl.
*G05B 19/418* (2006.01)
*G05B 23/02* (2006.01)
(Continued)

(52) U.S. Cl.
CPC ......... *G05B 19/4184* (2013.01); *G05B 23/02* (2013.01); *G05B 23/0216* (2013.01);
(Continued)

(58) Field of Classification Search
None
See application file for complete search history.

(56) References Cited

U.S. PATENT DOCUMENTS 5,875,108 A * 2/1999 Hoffberg ............... G06F 3/00
        700/17
9,933,338 B2 * 4/2018 Noda .................... G05B 23/024
(Continued)

FOREIGN PATENT DOCUMENTS

JP    H11338848 A    12/1999
JP    2007156881 A    6/2007
(Continued)

OTHER PUBLICATIONS

J. G. Field, K. R. Clarke and R. M. Warwick, "Practical Strategy for Analysing Multispecies Distribution Patterns", 1982, Marine Ecology (Year: 1982).*
(Continued)

*Primary Examiner* — YuJang Tswei
(74) *Attorney, Agent, or Firm* — Procopio, Cory, Hargreaves & Savitch LLP

(57) ABSTRACT

Provided is a plant data display processing device including: a data classification unit that classifies operation data into categories according to similarity; an evaluation index calculation unit that calculates an evaluation index of a category from a value of the operation data; and a classification result display processing unit that calculates a representative value of the operation data for each of the categories from the operation data contained in each of the categories, maps identification information of each of the categories to two-dimensional space in accordance with similarity of a representative value of the operation data, and generates three-dimensional image data in which the identification information of each of the categories is shown on a plane
(Continued)

formed of a first axis and a second axis, and the evaluation index of the category is shown on a third axis.

8 Claims, 19 Drawing Sheets

(51) Int. Cl.
    *G06T 11/20*     (2006.01)
    *G06T 19/00*     (2011.01)

(52) U.S. Cl.
    CPC ........ *G06T 11/206* (2013.01); *G05B 23/0221* (2013.01); *G05B 23/0275* (2013.01); *G05B 2219/32366* (2013.01); *G06T 19/00* (2013.01)

(56) References Cited

U.S. PATENT DOCUMENTS

| | | | | |
|---|---|---|---|---|
| 2006/0194329 A1* | 8/2006 | Ogiwara | ................ | G16C 20/20 436/89 |
| 2012/0032677 A1* | 2/2012 | Dannels | ............. | G01R 33/5659 324/309 |
| 2013/0054603 A1* | 2/2013 | Birdwell | .............. | G06K 9/6253 707/738 |
| 2015/0213706 A1* | 7/2015 | Bai | .................... | G05B 23/0221 340/635 |
| 2016/0063307 A1* | 3/2016 | Iwasa | ................... | G02B 21/244 348/79 |
| 2016/0232311 A1* | 8/2016 | Segal | ..................... | G16H 50/20 |
| 2017/0024877 A1* | 1/2017 | Versace | ................ | G06K 9/3241 |

FOREIGN PATENT DOCUMENTS

| | | | |
|---|---|---|---|
| JP | 2010237893 A | 10/2010 | |
| JP | 2015100766 A | 6/2015 | |

OTHER PUBLICATIONS

International Search Report of International Application No. PCT/JP2017/022278 dated Sep. 5, 2017, 3 pgs; English translation provided.

\* cited by examiner

[FIG. 1]
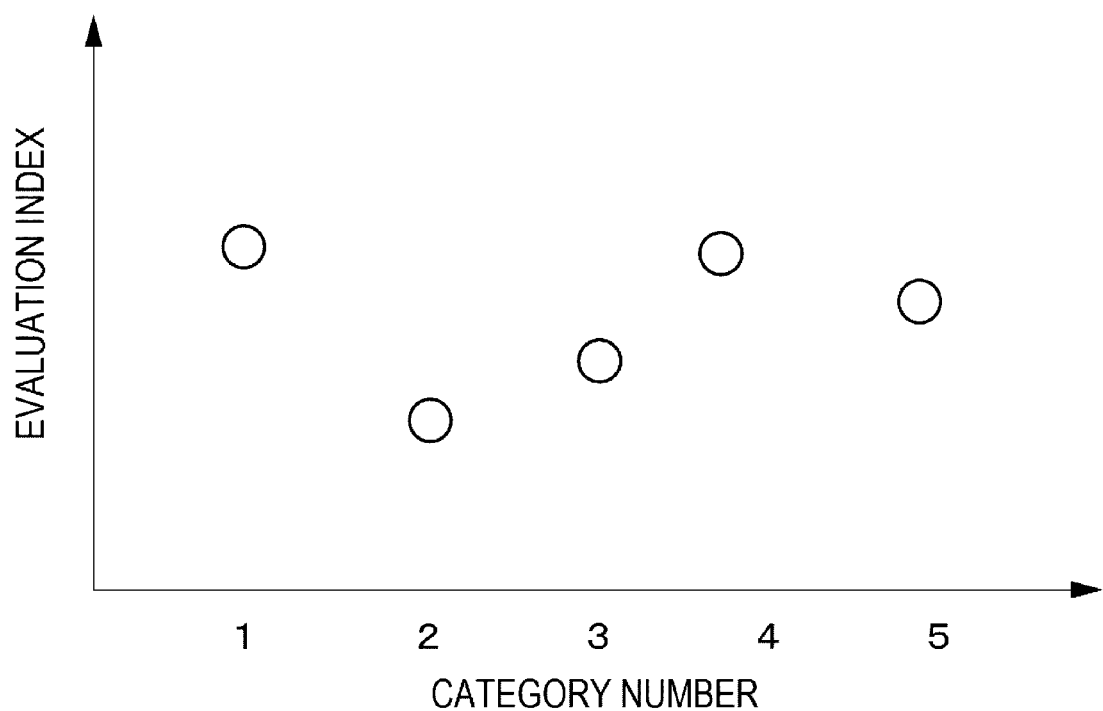

[FIG. 2]
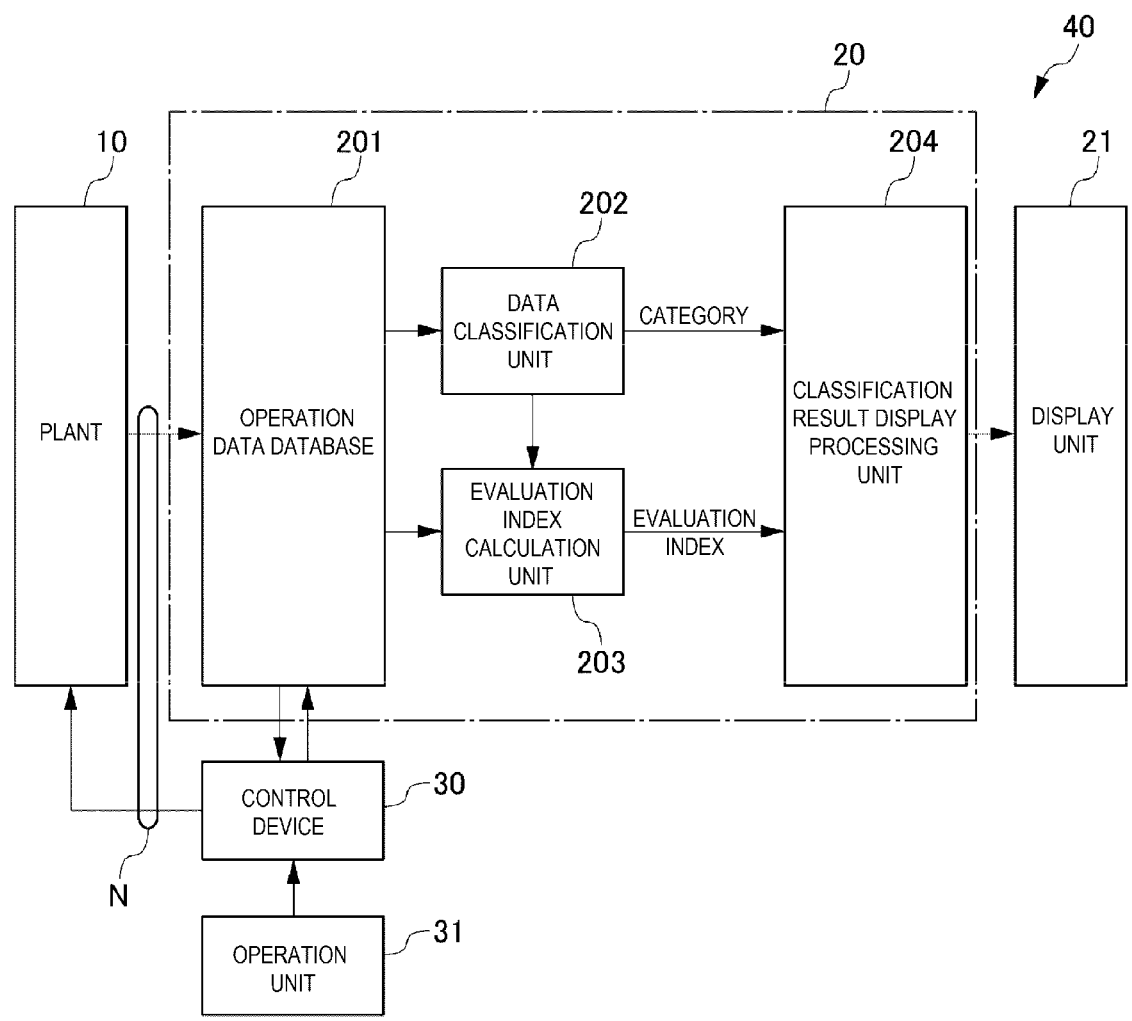

[FIG. 3]
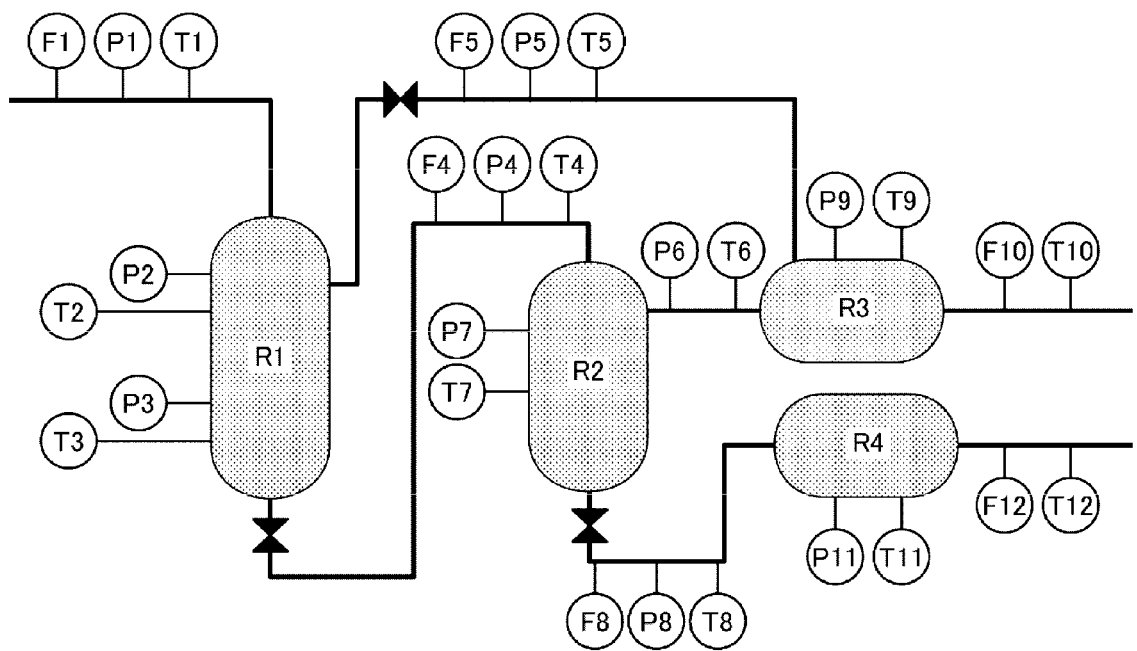

[FIG. 4]

| | F1 | P1 | T1 | ... | F12 | ... |
|---|---|---|---|---|---|---|
| DATE AND TIME | FIRST REACTOR INLET FLOW RATE | FIRST REACTOR INLET PRESSURE | FIRST REACTOR INLET TEMPERATURE | ... | FOURTH REACTOR INLET FLOW RATE | ... |
| 2016/3/3 10:01:00 | 3.20 | 0.35 | 158.1 | | 1.53 | |
| 2016/3/3 10:02:00 | 3.21 | 0.34 | 156.2 | | 1.54 | |
| 2016/3/3 10:03:00 | 3.18 | 0.35 | 156.8 | | 1.52 | |
| : | : | : | : | | : | |

201a

[FIG. 5]
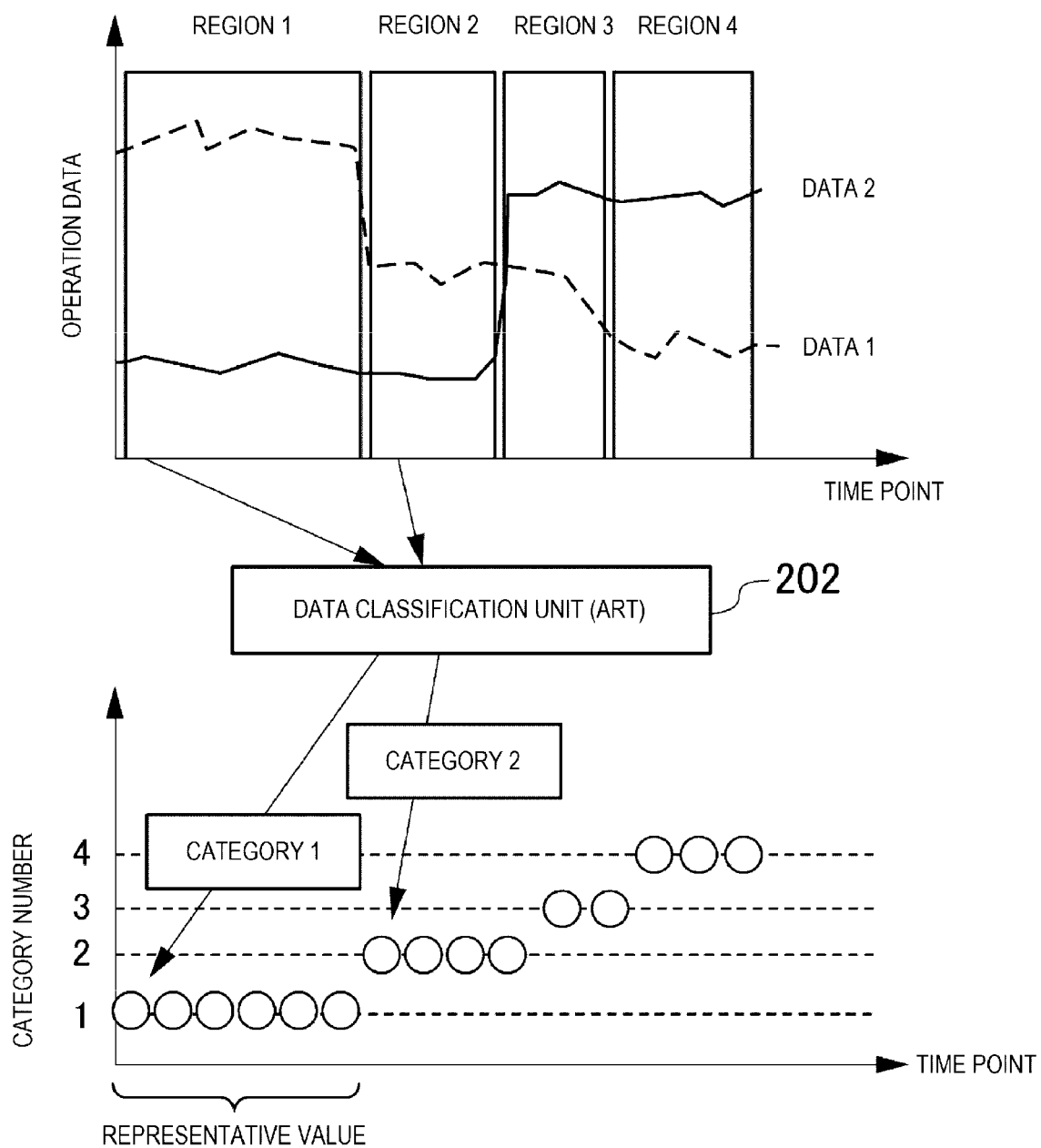

[FIG. 6]

| DATE AND TIME | EVALUATION INDEX (YIELD) |
|---|---|
| 2016/3/3 10:01:00 | 0.92 |
| 2016/3/3 10:02:00 | 0.93 |
| 2016/3/3 10:03:00 | 0.94 |
| ⋮ | ⋮ |

203a

[FIG. 7]
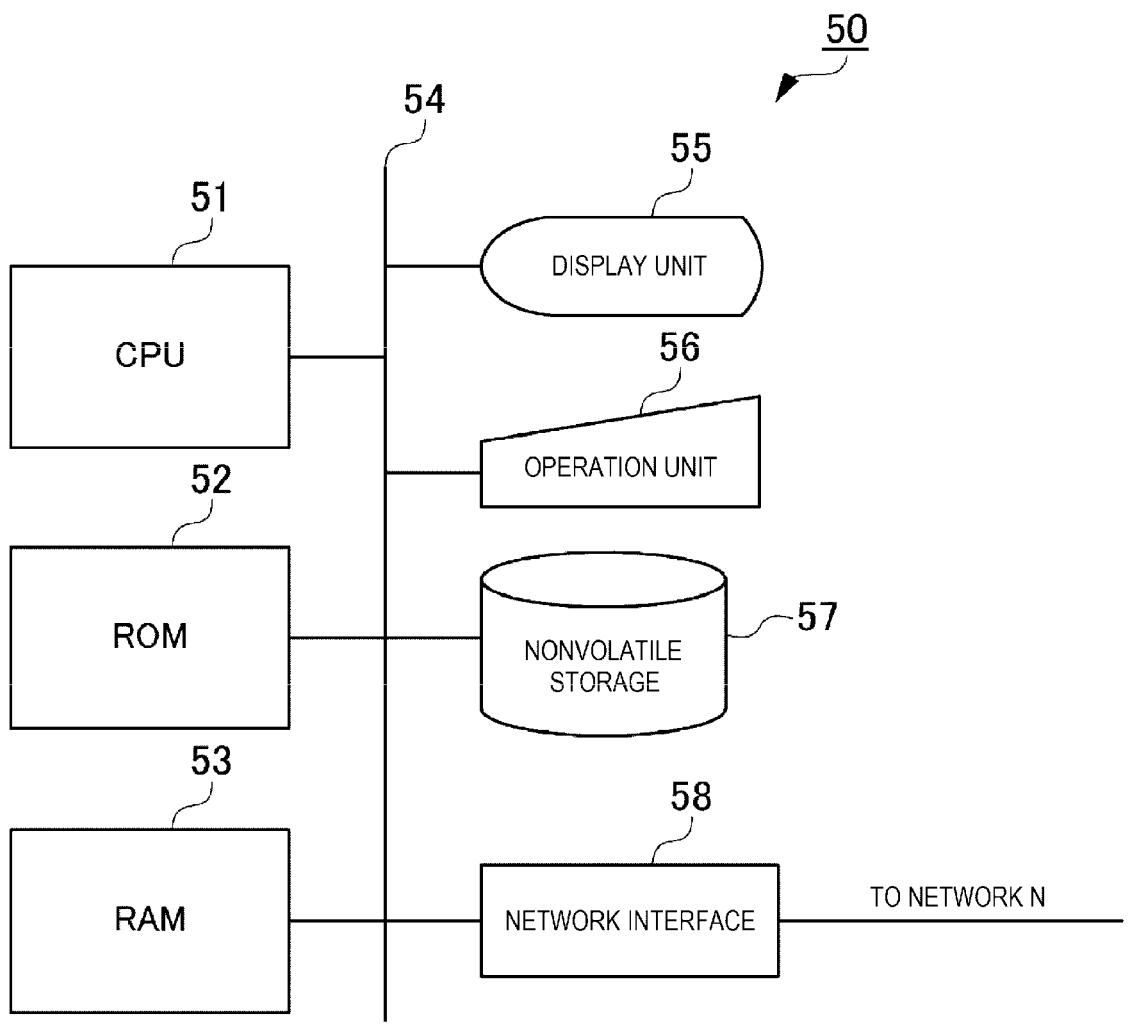

[FIG. 8]
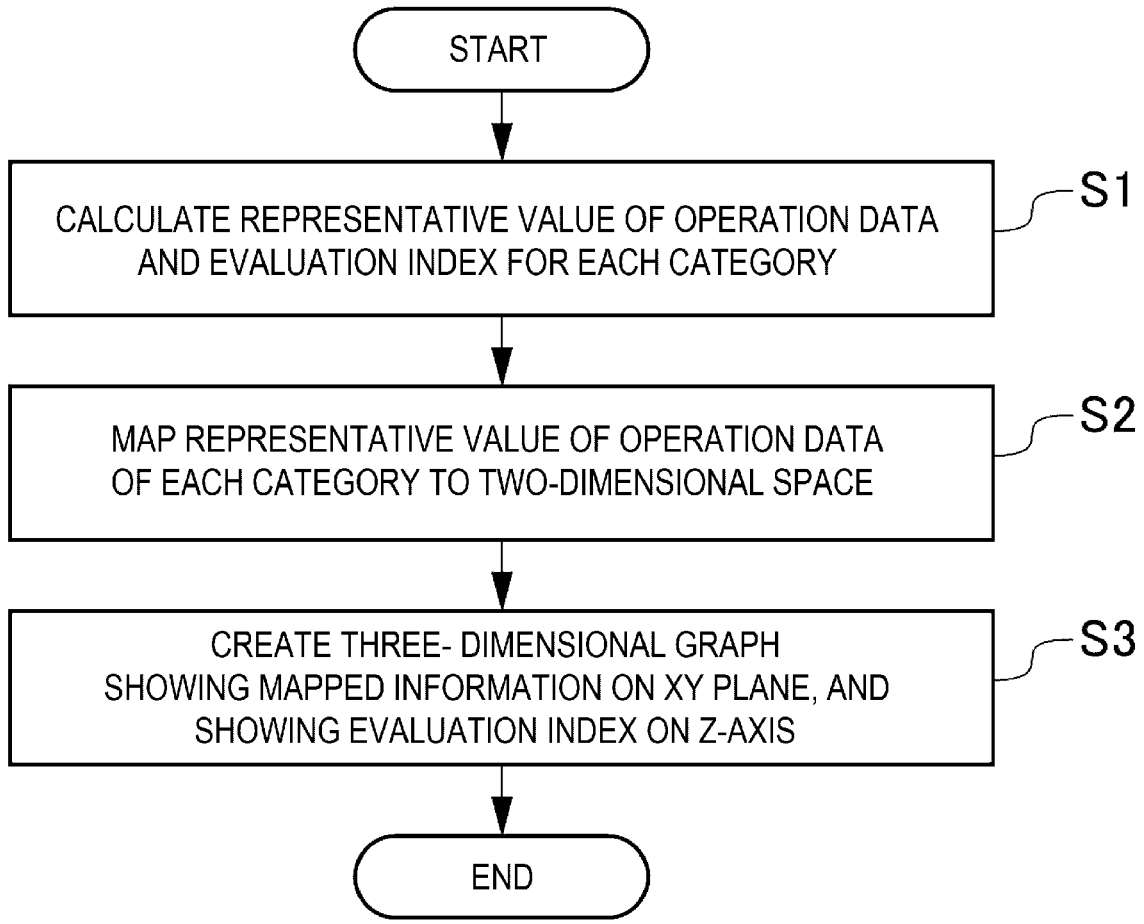

[FIG. 9]
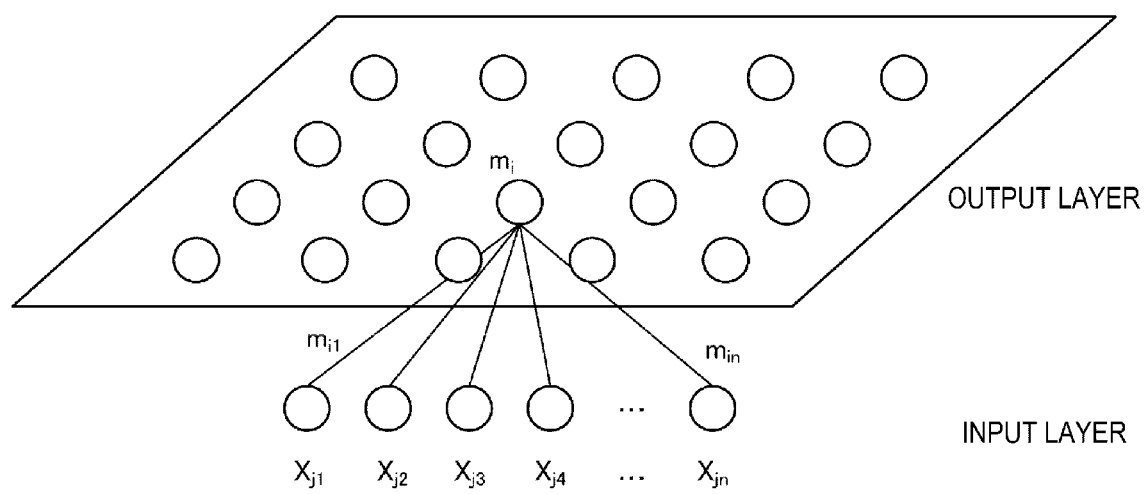

[FIG. 10]
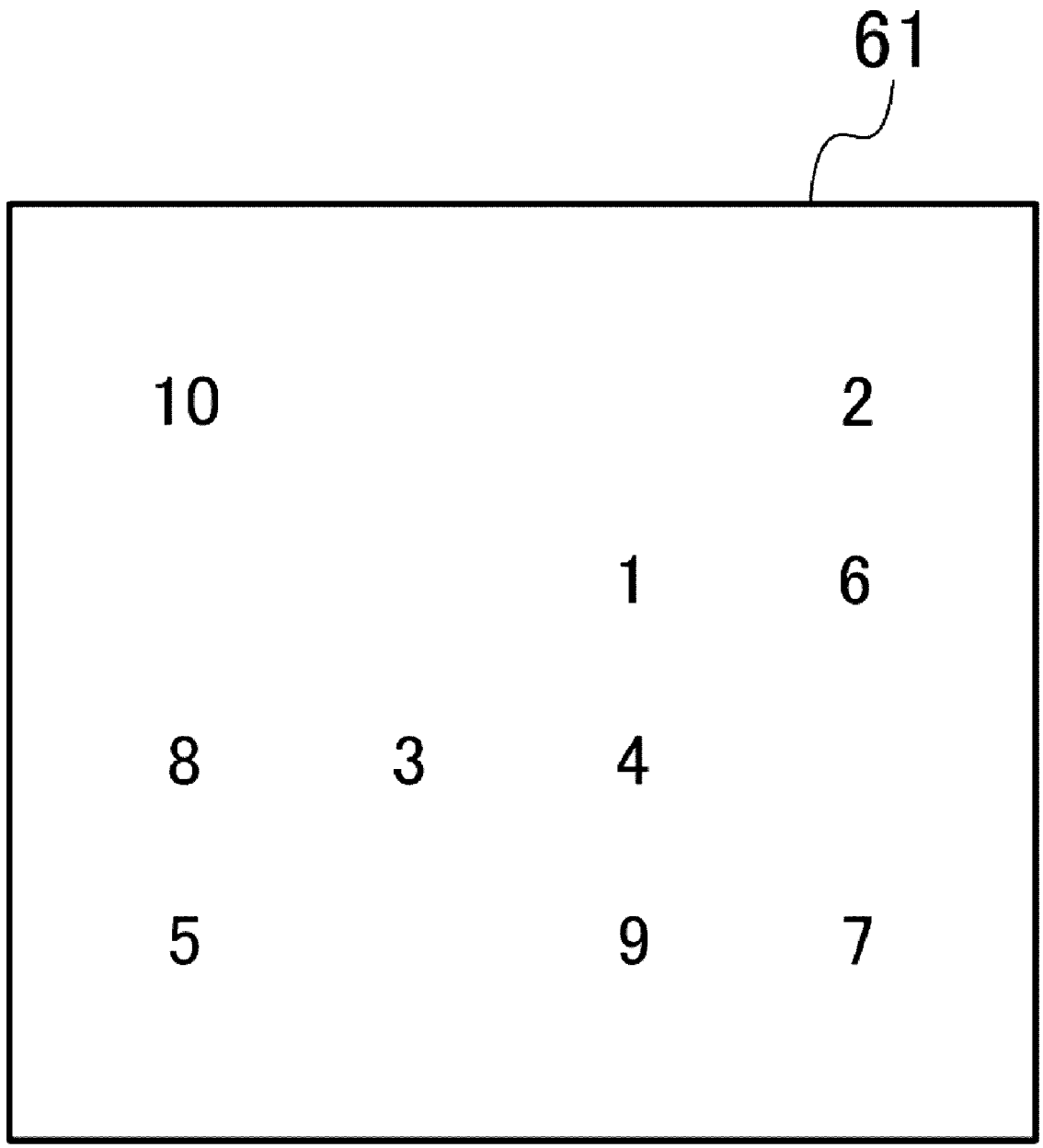

[FIG. 11]
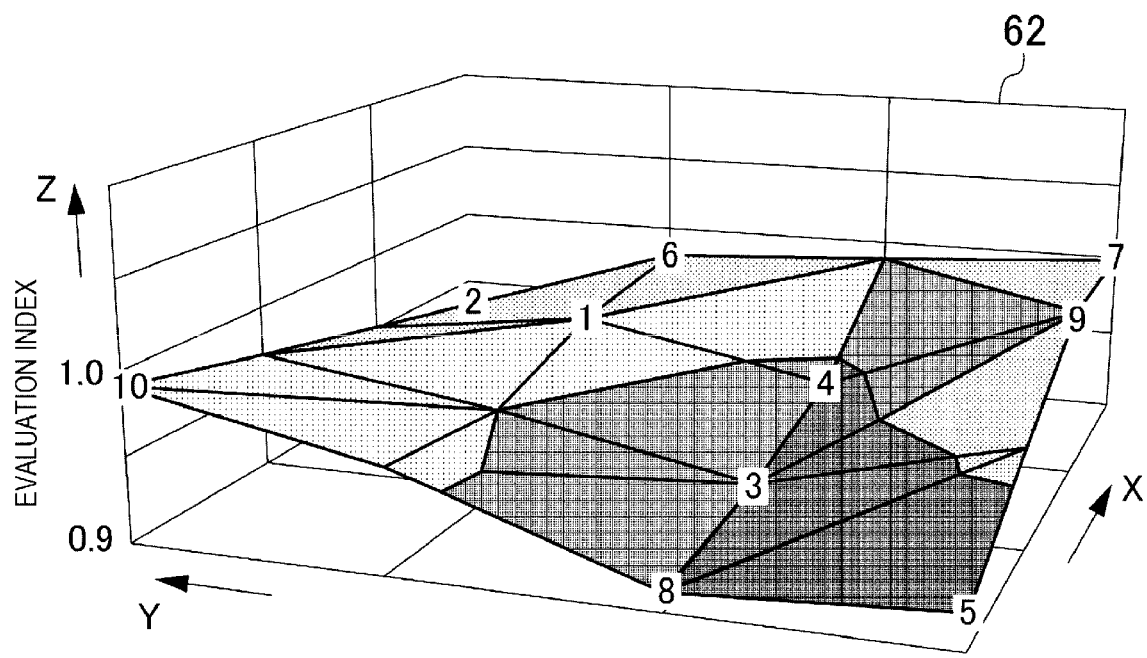

[FIG. 12]
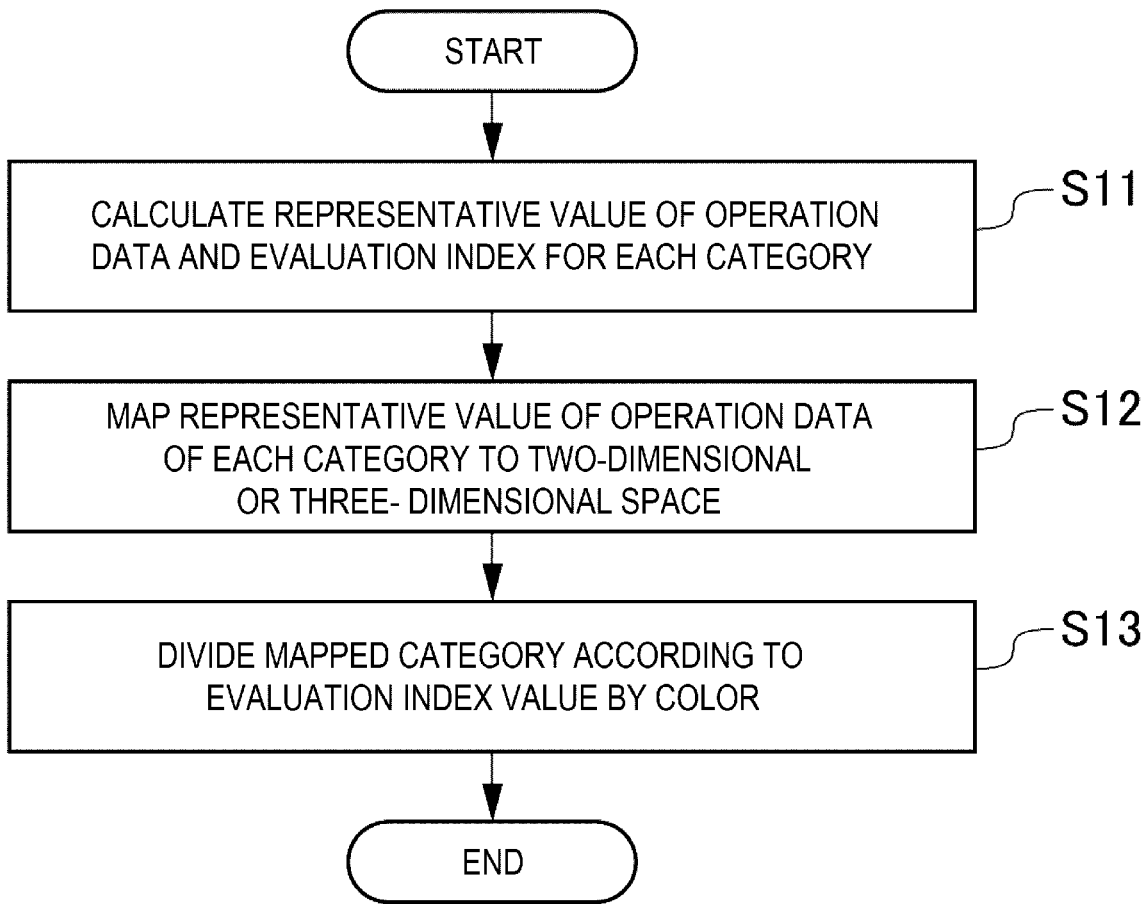

[FIG. 13]
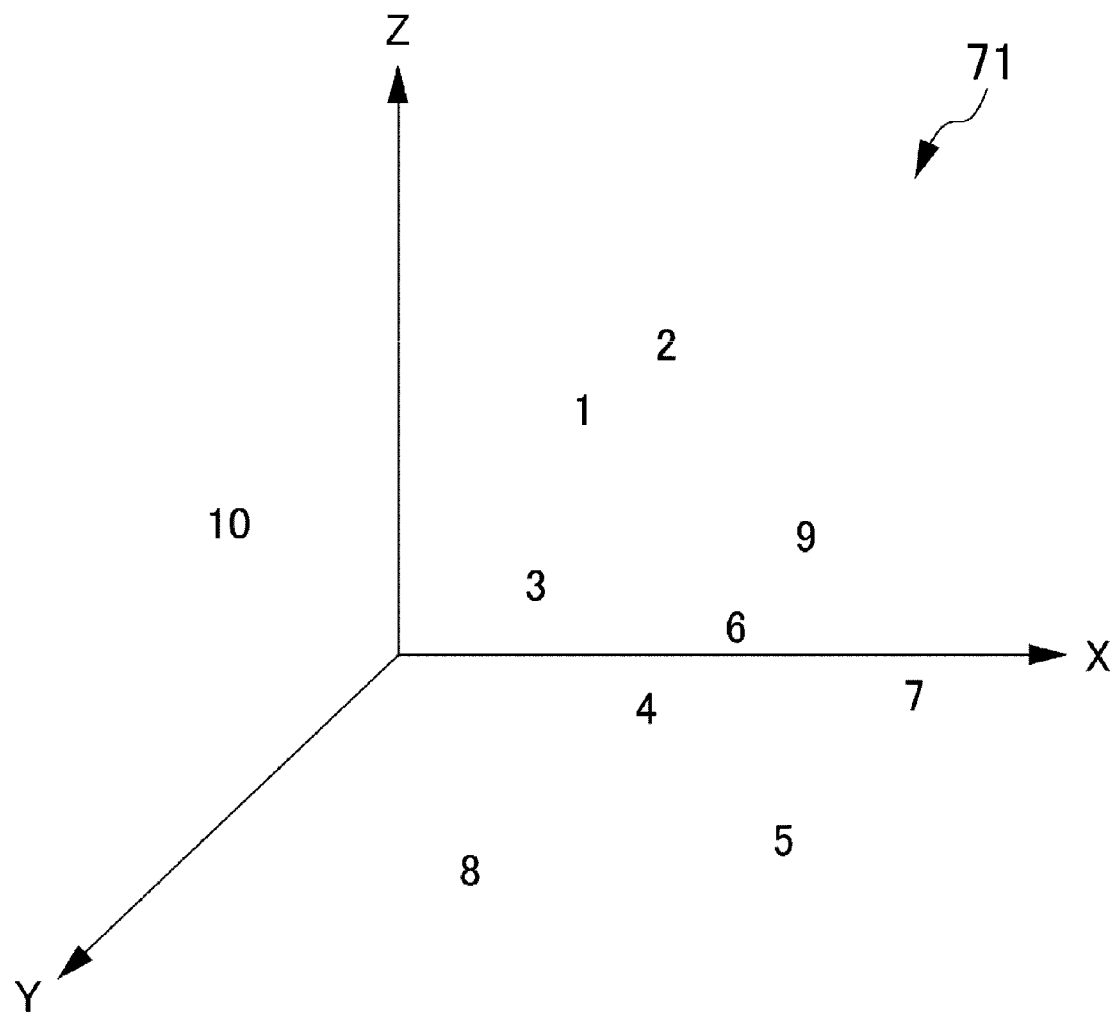

[FIG. 14]
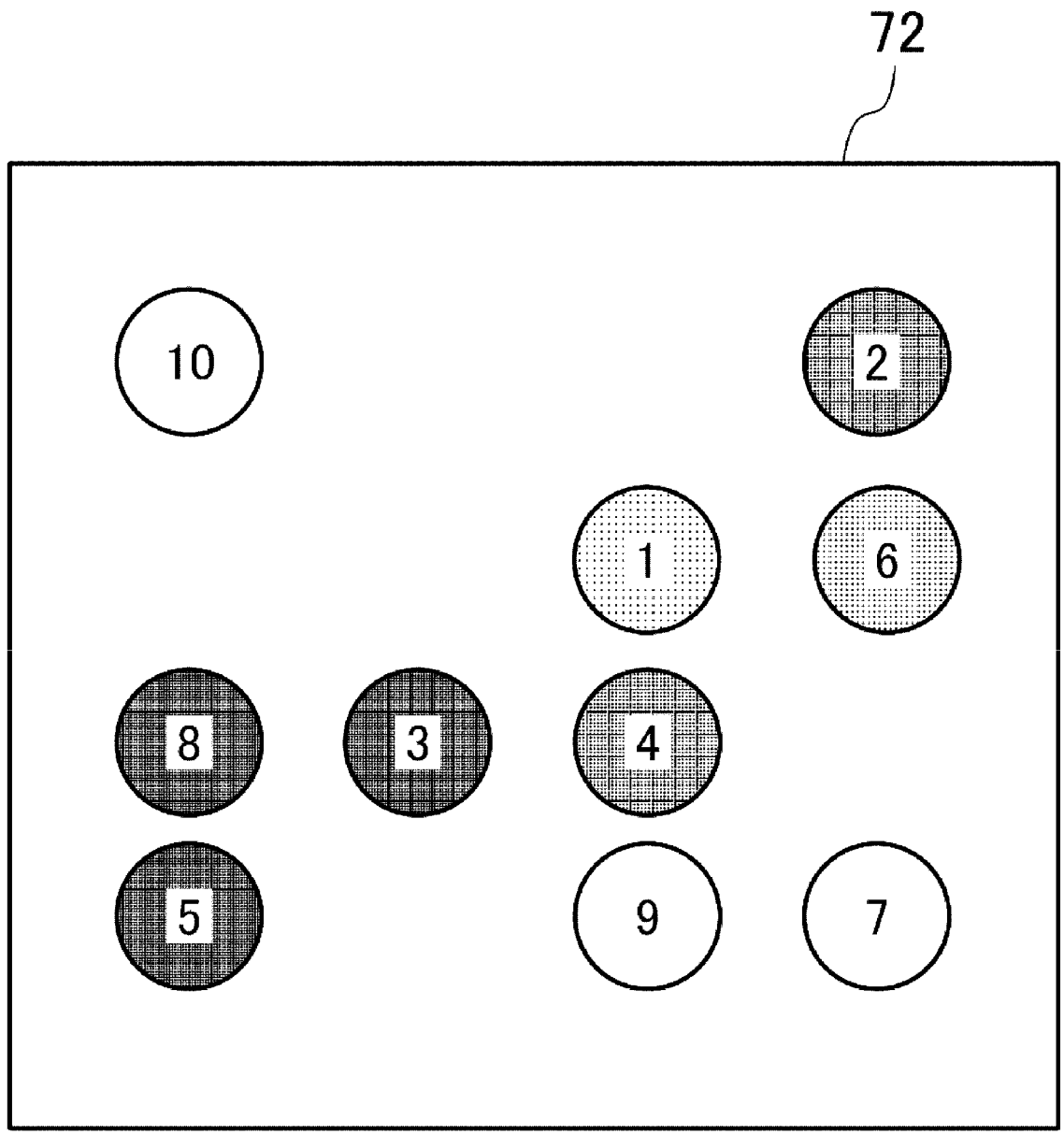

[FIG. 15]
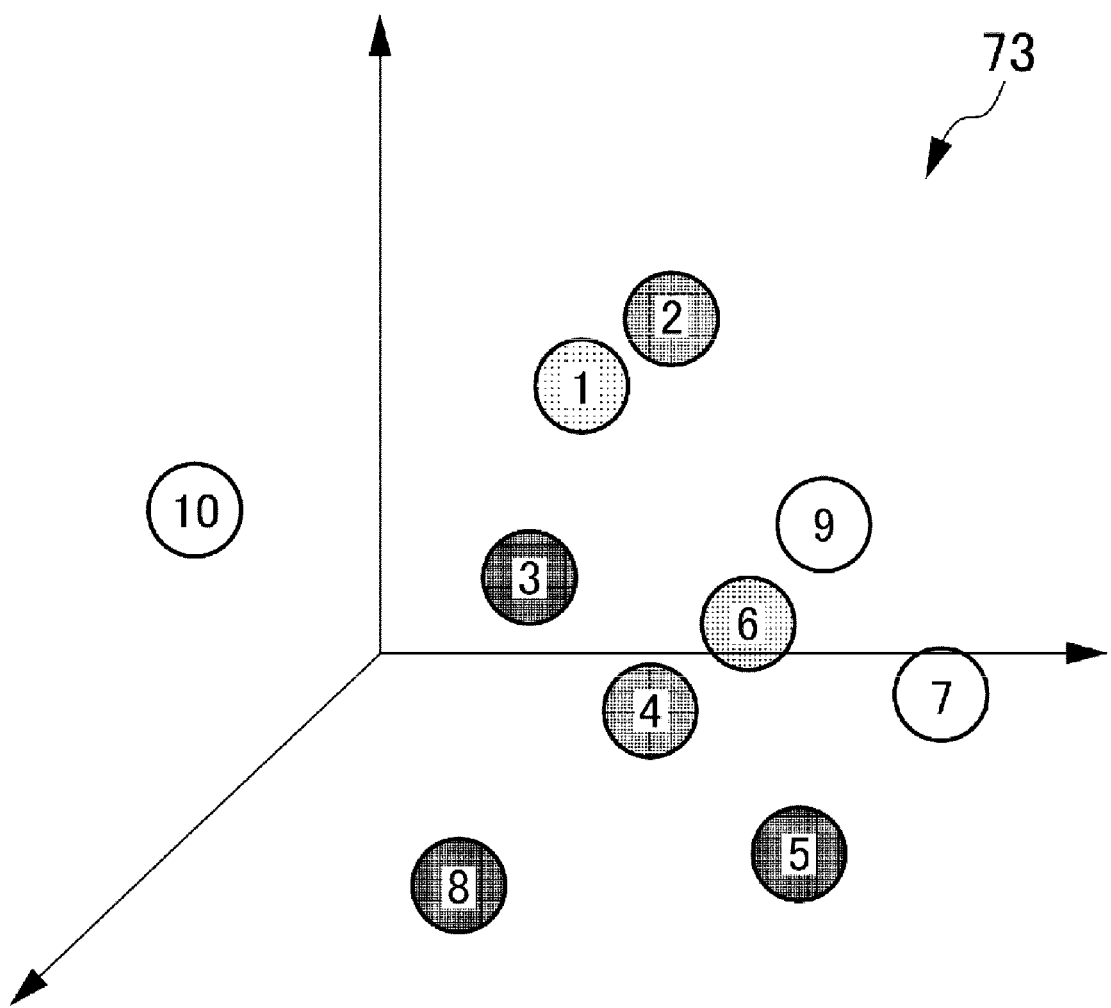

[FIG. 16]
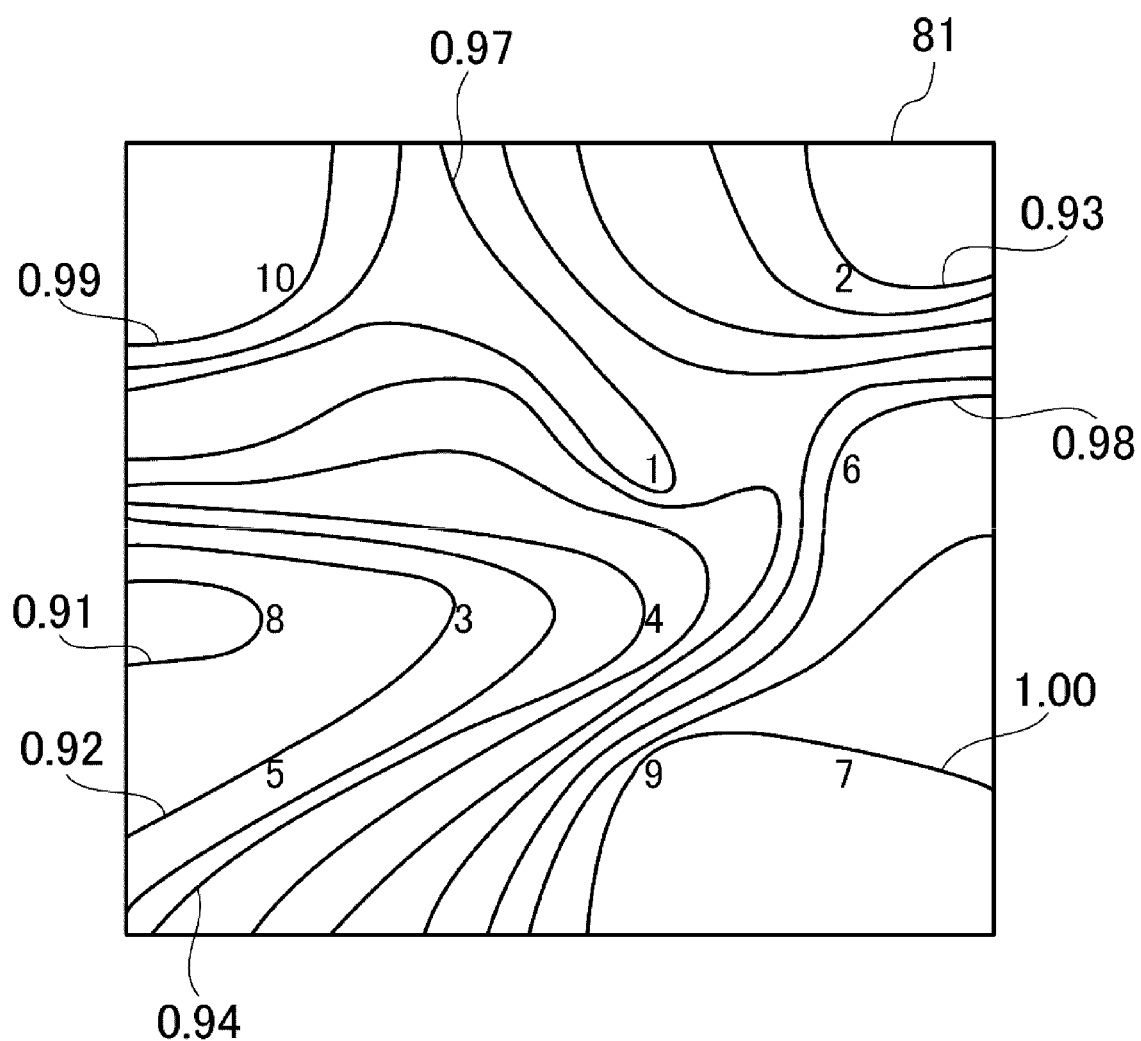

[FIG. 17]
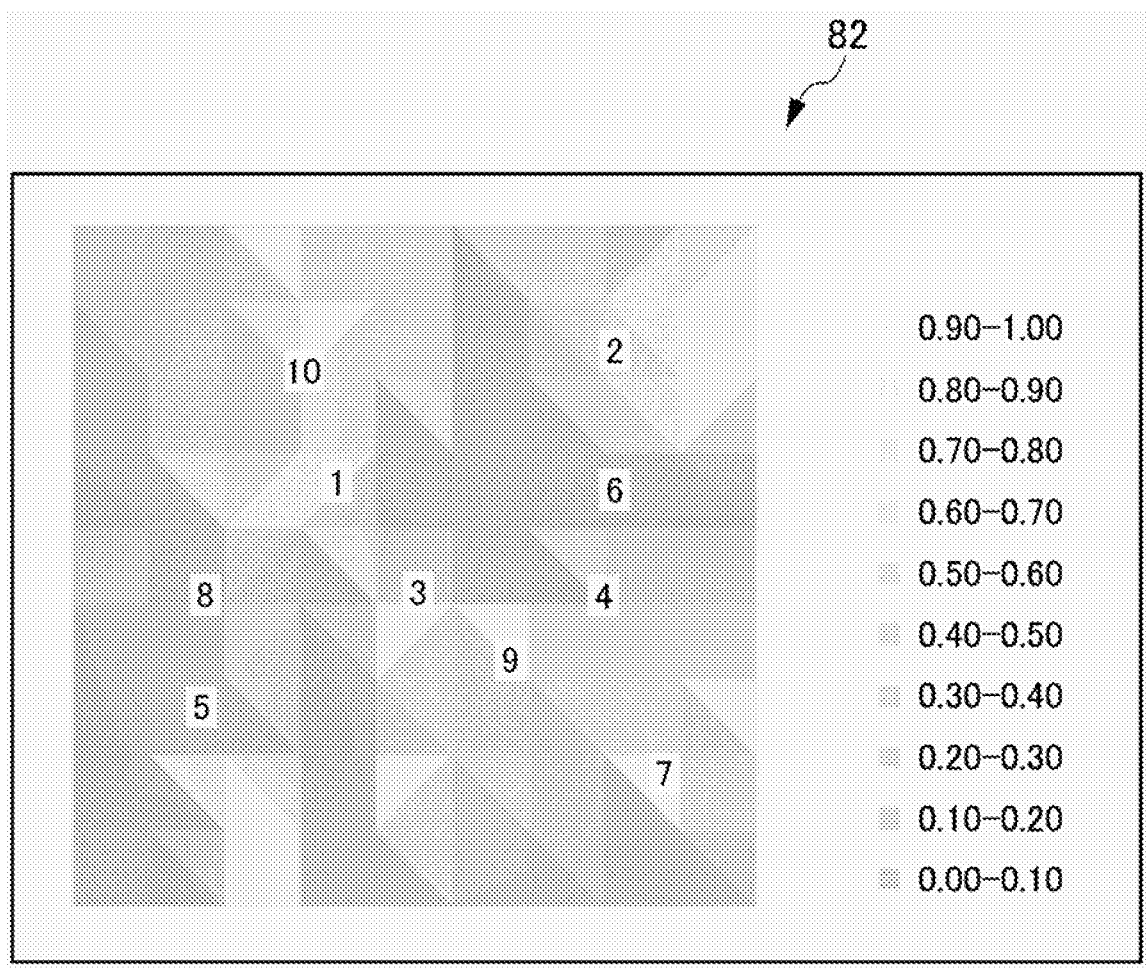

[FIG. 18]
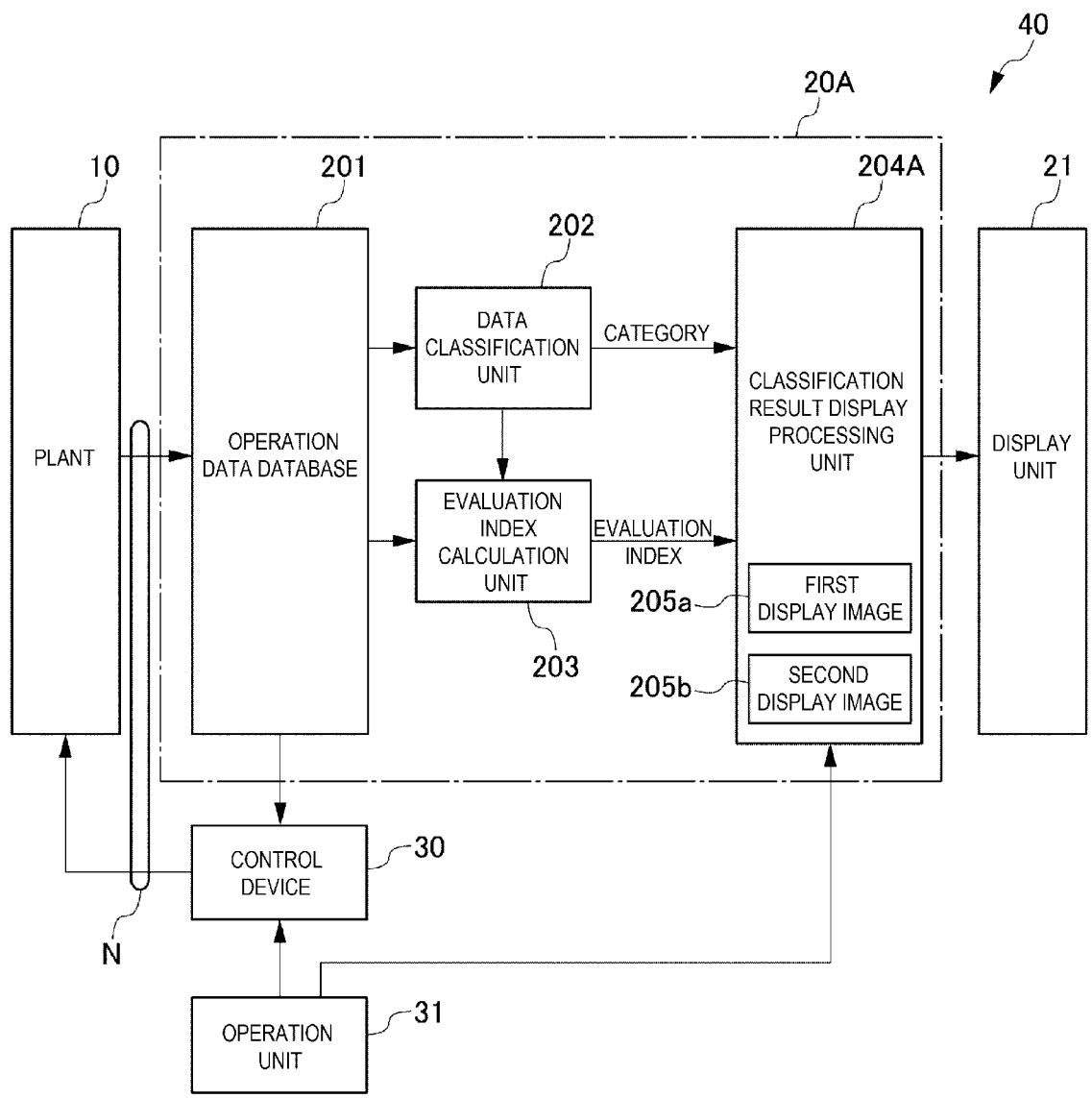

[FIG. 19]
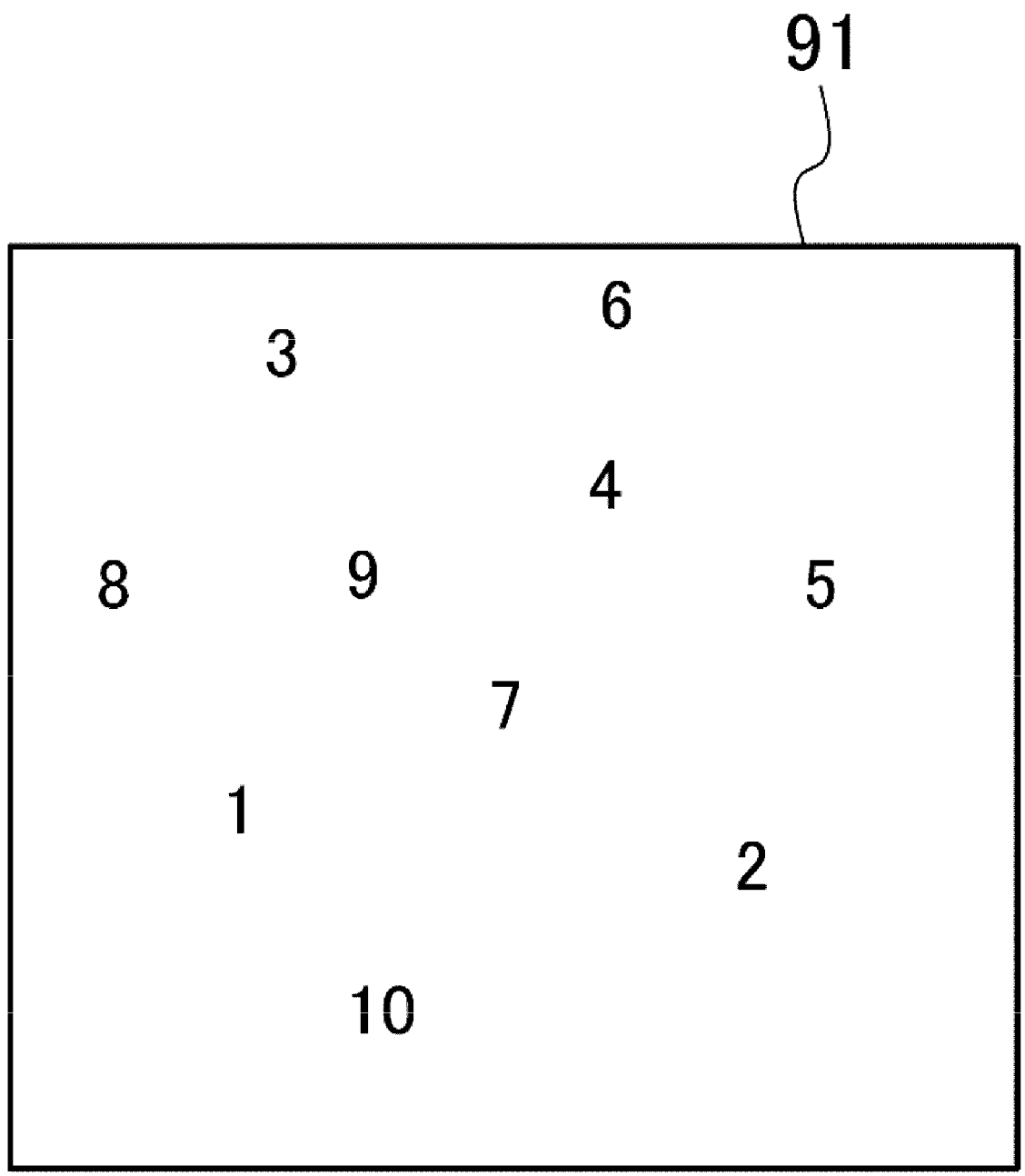

PLANT DATA DISPLAY PROCESSING DEVICE AND PLANT CONTROL SYSTEM

CROSS-REFERENCE TO RELATED APPLICATIONS

This application is a U.S. National Stage entry of PCT Application No: PCT/JP2017/022278 filed on Jun. 16, 2017, which claims priority to Japanese Patent Application No. 2016-182582, filed Sep. 20, 2016, the contents of which are incorporated herein by reference.

TECHNICAL FIELD

The present invention relates to a plant data display processing device that displays operation data such as temperature and pressure of plant equipment, and to a plant control system.

BACKGROUND ART

A power plant or a chemical plant is provided with many sensors such as a thermometer, a pressure gauge, a flow meter in order to monitor and control the plant. In recent years, there is a growing demand for improving operational efficiency of a plant or a yield of a product (plant equipment, machines constituting the plant equipment, etc.) by utilizing measurement data of these sensors.

In order to improve a performance index such as the operational efficiency of a plant or a yield of a product, it is necessary to model a relationship between a plant state and the performance index.

Therefore, for example, Patent Literature 1 describes a method of modeling relationships among parameters by showing operation parameters on an X-axis, condition parameters on a Y-axis and evaluation parameters on a Z-axis, and also describes a data display method of visualizing these relationships.

When the number of equipment or machines constituting a plant increases, the number of measurement points of the plant is very large. A data clustering technique is used as a method of classifying data (multidimensional data) in such a large number of measurement points. For example, Patent Literature 2 describes an abnormality diagnosis method of classifying multidimensional operation data into a plurality of categories by using a clustering technique referred to as Adaptive Resonance Theory. According to the method, a plant state can be managed by a category number since multidimensional plant data at each time point is classified into a plurality of categories in accordance with similarity.

PRIOR ART LITERATURE

Patent Literature

PTL 1: JP-A-2007-156881
PTL 2: JP-A-2010-237893

SUMMARY OF INVENTION

Technical Problem

However, it is difficult to visualize the relationships among these parameters in the technique described in Patent Literature 1 when a total number of items of the operation parameters and items of the condition parameters is three or more.

In addition, the technique described in Patent Literature 2 can manage the plant state by the category number. However, it is difficult to determine how to change a plant state when the plant state is to be changed.

In view of the situation, it was desired to clarify a relationship between categories classifying states of the multidimensional operation data of the plant, and to display a relationship between a category and an evaluation index.

Solution to Problem

A plant data display processing device according to a first aspect of the invention includes: an operation data database that stores plant operation data; a data classification unit that classifies multidimensional operation data acquired from the operation data database into categories according to similarity, and outputs categories as classification results; and an evaluation index calculation unit that calculates evaluation indexes of the categories from a value of the operation data stored in the operation data database.

The plant data display processing device further includes a classification result display processing unit that calculates a representative value of the operation data for each of the categories from the operation data contained in each of the categories output from the data classification unit, maps identification information of each of the categories to two-dimensional space in accordance with similarity of the representative value of the operation data, and generates three-dimensional image data in which the mapped identification information of the categories is shown on a plane formed of a first axis and a second axis, and the evaluation indexes of the categories calculated by the evaluation index calculation unit are shown on a third axis.

A plant data display processing device according to a second aspect of the invention includes: an operation data database that stores plant operation data; a data classification unit that classifies multidimensional operation data acquired from the operation data database into categories according to similarity, and outputs categories as classification results; and an evaluation index calculation unit that calculates evaluation indexes of the categories from a value of the operation data stored in the operation data database.

The plant data display processing device further includes a classification result display processing unit that calculates a representative value of the operation data for each of the categories from the operation data contained in each of the categories output from the data classification unit, maps identification information of each of the categories to two-dimensional or three-dimensional space in accordance with similarity of the representative value of the operation data, and generates image data in which a color or shade of the mapped identification information of each of the categories is changed in accordance with representative values of the evaluation indexes of the categories calculated by the evaluation index calculation unit.

Advantageous Effect

According to at least one aspect of the invention, a relationship between categories classifying states of multidimensional operation data of a plant is clarified. In addition, a relationship between a category and an evaluation index of the plant can be displayed in combination. Therefore, a surveillance staff can easily decide an operation method of improving a value of the evaluation index of the plant.

Problems, configurations and effects other than the above will be apparent with reference to descriptions of following embodiments.

BRIEF DESCRIPTION OF DRAWINGS

FIG. 1 shows an example of a display mode that shows a relationship between a category number and an evaluation index.

FIG. 2 is a block diagram showing a configuration example of a plant control device including a data display processing device according to a first embodiment of the invention.

FIG. 3 is an example of a system diagram of a plant.

FIG. 4 shows an example of operation data stored in an operation data database.

FIG. 5 is an illustrative diagram showing an outline of a classification method of operation data using Adaptive Resonance Theory (ART).

FIG. 6 shows an example of evaluation index data.

FIG. 7 is a block diagram showing a hardware configuration of each device in FIG. 2.

FIG. 8 is a flow chart showing processing of a classification result display processing unit according to the first embodiment of the invention.

FIG. 9 is an illustrative diagram of the Adaptive Resonance Theory.

FIG. 10 shows an example in which a category number according to the first embodiment of the invention is mapped to two-dimensional space.

FIG. 11 shows an example of a three-dimensional graph that shows a relationship between an evaluation index and the category number according to the first embodiment of the invention.

FIG. 12 is a flow chart showing processing of a classification result display processing unit according to a second embodiment of the invention.

FIG. 13 shows an example in which a category number according to the second embodiment of the invention is mapped to three-dimensional space.

FIG. 14 shows an example in which a shade of a color of a category number mapped to two-dimensional space according to the second embodiment of the invention is changed in accordance with a representative value of an evaluation index.

FIG. 15 shows an example in which a shade of a color of a category number mapped to three-dimensional space according to the second embodiment of the invention is changed in accordance with a representative value of an evaluation index.

FIG. 16 shows a relationship between an evaluation index and a category number mapped to two-dimensional space according to a first example of a third embodiment of the invention, in accordance with a representative value of an evaluation index, by using a contour line.

FIG. 17 shows a relationship between an evaluation index and a category number mapped to two-dimensional space according to a second example of the third embodiment of the invention, in accordance with a representative value of an evaluation index, by using contour information.

FIG. 18 is a block diagram showing a configuration example of a plant control device including a data display processing device according to a fourth embodiment of the invention.

FIG. 19 shows an example in which a designated category number according to a fifth embodiment of the present invention is mapped to a center of two-dimensional space.

DESCRIPTION OF EMBODIMENTS

Hereinafter, embodiments of the invention will be described with reference to the accompanying drawings. The descriptions will be given in the following order. Configuration elements having the same function or configuration in the drawings are denoted by the same reference numerals, and redundant descriptions thereof are omitted.

1. A first embodiment (an example of three-dimensionally displaying a mapped category number and an evaluation index)

2. A second embodiment (an example of displaying a mapped category number by color in accordance with an evaluation index)

3. A third embodiment (an example of distinguishably displaying category numbers in accordance with evaluation indexes)

4. A fourth embodiment (an example of switching between 3-dimensional display and 2-dimensional display)

5. A fifth embodiment (an example of mapping a designated or current category number to a center)

1. First Embodiment

[Research]

The inventors considered a method of visualizing a relationship between a plant state (category number) and an evaluation index by combining the techniques described in Patent Literature 1 and Patent Literature 2.

FIG. 1 shows an example of a display mode showing a relationship between a category as a plant state and an evaluation index.

As shown in FIG. 1, the relationship between the plant state (category number) and the evaluation index can be visualized by taking the category number on a horizontal axis and taking a representative value of the evaluation index of operation data contained in each of categories on a vertical axis.

However, the category number shown on the horizontal axis in FIG. 1 is a classification determined by an occurrence order of categories, and does not show proximity between categories in terms of data space. Therefore, it is difficult to determine how to change the plant state when the plant state is to be transitioned from a current category to a category with a high evaluation index.

In the example of FIG. 1, evaluation indexes of a category 1 and a category 4 are high. It is desirable to transition the plant state to a state of the category 1 or the category 4 when current operation data of the plant is in a state of a category 3. However, it is impossible to determine whether the state of the category 1 or the state of the category 4 is close to the state of the category 3 when viewed from the state of the category 3. Therefore, it is difficult to set a goal to be aimed at.

Accordingly, the inventors clarified a relationship between categories classifying states of multidimensional operation data, and did extensive researches on a method of displaying the relationship between the operation data of the plant and the evaluation index in combination. As a result, the inventors invented the configuration described below.

[Overall Configuration of Plant Control Device]

FIG. 2 shows a configuration example of a plant control device including a data display processing device according to the first embodiment of the invention.

As shown in FIG. 2, a plant control system 40 according to the first embodiment includes a data display processing device 20, which performs classification processing of operation data of a plant 10 and display processing of the classification result, a display unit 21, a control device 30, and an operation unit 31.

The data display processing device 20 (an example of a plant data display processing device) includes an operation data database 201, a data classification unit 202, an evaluation index calculation unit 203, and a classification result display processing unit 204.

The operation data database 201 stores time series data that is measurement data such as temperature, pressure, and flow rates of equipment or machines constituting the plant 10. The measurement data is input via an input interface (not shown). In addition, the operation data database 201 stores time series data that is control setting value data or operation amount data such as valve opening input from the control device 30. Hereinafter, the measurement data, the operation amount data, and the setting value data are collectively referred to as "operation data". However, measurement data may also be referred to as operation data.

(Example of System Diagram)

FIG. 3 shows an example of a system diagram of the plant 10.

Hereinafter, a chemical plant will be described as an example of the plant 10. FIG. 3 is an example of a system diagram of a chemical plant displayed on a screen of the display unit 21. A system diagram is, for example, an electronic file created by CAD software for system diagram creation, and shows a machine, connection piping, and a major measurement machine therein. A system diagram is also referred to as Piping and Instrumentation Line Diagram or Piping & Instrument Flow Diagram (P & ID). The system diagram shows information of machines (reactors R1 to R4 in FIG. 3), piping connecting the machines, and a measurement instrument. In FIG. 3, the measurement instrument is provided with a tag such as F1, P1, and T1. In the present embodiment, F indicates a flow meter, P indicates a pressure gauge, and T indicates a thermometer. A system shown in FIG. 3 is provided with 28 measurement instruments.

(Example of Operation Data)

FIG. 4 shows an example of operation data stored in the operation data database 201.

Operation data 201a is time series data in which values of a flow rate, pressure, and temperature at each time point are stored. In the example of FIG. 4, measurement data such as a first reactor inlet flow rate and a first reactor inlet pressure are stored, for example, at intervals of several seconds. The measurement data is measured at each part of the system diagram (FIG. 3) of the plant 10.

The description will now return to FIG. 2. The data classification unit 202 classifies, by using a data clustering technique, multidimensional operation data acquired from the operation data database 201 into categories according to similarity. Further, the data classification unit 202 outputs a classification result (a category number in the present embodiment) to the evaluation index calculation unit 203 and the classification result display processing unit 204. Several methods have been proposed as the data clustering technique. Alternatively, the Adaptive Resonance Theory (ART) was used in the present embodiment. However, a classification method is not limited to the Adaptive Resonance Theory, and other data clustering techniques may be used.

(Classification Method of Operation Data)

FIG. 5 shows an outline of a classification method of operation data using the Adaptive Resonance Theory (ART). In an upper part of FIG. 5, a horizontal axis indicates time points, and a vertical axis indicates values of the operation data. In addition, in a lower part of FIG. 5, a horizontal axis indicates time points, and a vertical axis indicates category numbers.

ART is a model that simulates pattern recognition algorithm of human, and can classify multidimensional data into a plurality of categories in accordance with similarity thereof. Since the content of ART is described in known literature or the like, detailed descriptions thereof will be omitted and only a data classification method using ART will be described with reference to FIG. 5. An example of the data classification method using the ART is described, for example, in JP-A-2005-258649.

In general, the operation data to be input to the ART is data of four dimensions or more. However, it is considered herein to simplify the data and classify two-dimensional time series data (data 1 and data 2) shown in the upper part of FIG. 5. Data at each time point among the time series data is set as two-dimensional data that is the data 1 and the data 2.

When the two-dimensional data is input to the data classification unit 202 (ART), data of a region 1 where values of the data 1 are larger than values of the data 2 is, for example, classified into a certain category (category 1) (lower part in FIG. 5). In addition, data of a region 2 is classified as another category (category 2) since data of region 2 is different from the data of region 1 in a relationship between the data 1 and the data 2. Similarly, data of region 3 and region 4 is classified as different categories, respectively. In the present embodiment, data of 28 items shown in FIG. 4 was classified as input items by the ART.

A category is identified by a number (numeral) in the present embodiment. Alternatively, the category may be identified by using several symbols. That is, the number is an example of identification information of the category. In addition, a shape such as a circle (sphere) surrounding the number shows a position of the category, and is information through which the category thereof can be distinguished from another category, so that the shape is contained in the identification information in a broad sense.

The description will now return to a functional block in FIG. 2. The evaluation index calculation unit 203 calculates an evaluation index of the plant 10 from a value of the operation data stored in the operation data database 201.

A yield of a product (a system in FIG. 3) was calculated as the evaluation index of the plant 10 in the present embodiment. Specifically, among the operation data 201a shown in FIG. 4, values of the first reactor inlet flow rate and a fourth reactor outlet flow rate are applied to equation (1). The first reactor inlet flow rate is an inlet flow rate of the reactor R1 measured by a flow meter F1, and the fourth reactor outlet flow rate is an outlet flow rate of the reactor R4 measured by a flow meter F12.

$$\text{Yield of Product} = K \times (\text{value of flow meter } F12)/(\text{value of flow meter } F1) \qquad (1)$$

Here, K is a coefficient calculated from a theoretical formula, and the yield of the product is 100% in an ideal operation state.

[Example of Evaluation Index Data]

FIG. 6 shows an example of evaluation index data.

In evaluation index data 203a shown in FIG. 6, the evaluation index (yield) is calculated and recorded at intervals of several seconds, for example, corresponding to acquisition timing of the operation data 201a in FIG. 4.

The description will now return to the functional block in FIG. 2. The classification result display processing unit 204 maps information (category number) of the category classified by the data classification unit 202 to two-dimensional or three-dimensional space (mapping). Further, the classification result display processing unit 204 generates image data indicating a relationship between the evaluation index and the category number mapped to the two-dimensional or the three-dimensional space (graphing). In the first embodiment, the classification result display processing unit 204 generates three-dimensional image data indicating a relationship between the evaluation index and the category number mapped to the two-dimensional space, and outputs the three-dimensional image data to the display unit 21. Operation of the classification result display processing unit 204 will be described in detail below.

The display unit 21 displays the image data on a screen. The image data is generated by the classification result display processing unit 204, and indicates the relationship between the category number and the evaluation index.

The control device 30 monitors and controls the plant 10 based on the operation data of the plant 10 stored in the operation data database 201. In addition, the control device 30 controls the plant 10 in accordance with an operation signal input from the operation unit 31.

The operation unit 31 receives input operation of a surveillance staff, and inputs an operation signal according to the input operation to the control device 30.

[Hardware Configuration of Devices]

FIG. 7 is a block diagram showing a hardware configuration of devices in FIG. 2.

Here, a hardware configuration of a computer 50, which constitutes the data display processing device 20 and the control device 30 shown in the plant control system 40, will be described. Units of the computer 50 are selected according to a function and a purpose of use of the devices.

The computer 50 includes a central processing unit (CPU) 51, a read only memory (ROM) 52, and a random access memory (RAM) 53, which are separately connected to a bus 54. Furthermore, the computer 50 includes a display unit 55, an operation unit 56, a nonvolatile storage 57, and a network interface 58.

The CPU 51 reads a program code of software that achieves functions according to the present embodiment from the ROM 52, and executes the program code. The computer 50 may include a processing device such as a micro-processing unit (MPU) instead of the CPU 51. Variables, parameters, or the like generated during arithmetic processing are temporarily written in the RAM 53.

The display unit 55 is, for example, a liquid crystal display monitor, and displays a result or the like of processing performed by the computer 50. The display unit 55 corresponds to the display unit 21 in FIG. 2. A keyboard, a mouse, a touch panel, or the like are used as the operation unit 56, so that the surveillance staff can perform predetermined operation input and instructions. In addition, the operation unit 56 may be an operation element such as an operation key or a button switch. The operation unit 56 corresponds to the operation unit 31 in FIG. 2.

Examples of the nonvolatile storage 57 include a hard disk drive (HDD), a solid state drive (SSD), a flexible disk, an optical disk, a magneto-optical disk, a CD-ROM, a CD-R, a magnetic tape, a nonvolatile memory card, or the like. The nonvolatile storage 57 may record a program for causing the computer 50 to function in addition to an operating system (OS), various parameters or data. For example, the nonvolatile storage 57 may store the data of the operation data database 201, and the evaluation index data 203a.

A network interface card (NIC) or the like is used as the network interface 58, and various data can be transmitted and received between the devices via a network N such as LAN.

All or a part of the data display processing device 20 and of the control device 30 may be constituted by a single computer.

[Processing of Classification Result Display Processing Unit 204]

FIG. 8 is a flow chart showing processing of the classification result display processing unit 204.

First, in step S1, the classification result display processing unit 204 calculates, based on the operation data contained in each of the categories classified by the data classification unit 202, a representative value of the operation data and of the evaluation index for each of the categories. That is, the classification result display processing unit 204 calculates a representative value of each item of the operation data contained in each of the categories, and calculates operation of the plant 10.

The operation data used in the present embodiment is, for example, data of the 28 items shown in FIG. 3. For example, assuming that data contained in the category 1 has 100 points (100 sampling points), an average value of 100 points of data is calculated for each item such as the first reactor inlet flow rate measured by the flowmeter F1 and the first reactor inlet pressure measured by the pressure gauge P1.

In addition, the evaluation index is the yield of the product calculated by the equation (1), and the average value of 100 points is similarly calculated for the evaluation index.

The average value is adopted as the representative value in the present embodiment. Alternatively, other representative values such as a median value may be adopted.

Next, in step S2, the representative value of each item of the operation data contained in each of the categories is mapped to two-dimensional space in accordance with similarity of the representative value calculated in the step S1 of each item of the operation data among categories (mapping). In the following descriptions, mapping the representative value of each item of the operation data contained in each of the categories to the two-dimensional space may be referred to as "mapping a category number to two-dimension space".

In the present embodiment, a self-organizing map is used as a method of mapping a representative value of operation data. The self-organizing map, which is a kind of a neural network, is a method of mapping high-dimensional data to 1 to 3 dimensional space, and is intended to reproduce a positional relationship, which is in high-dimensional space, in low-dimensional space.

[Outline of Self-Organizing Map]

Here, the outline of the self-organizing map will be described.

FIG. 9 shows a configuration of a case where n-dimensional data (Xj1 to Xjn) is mapped to two-dimensional space.

As shown in FIG. 9, the self-organizing map includes two layers: an input layer that inputs input data, and an output layer that maps the input data. The input data and the mapped data are also referred to as nodes. In a case where the input data is mapped to the two-dimensional space, the nodes are arranged in two-dimensional space (for example, lattice shape) in the output layer. That is, positions of the nodes in the output layer correspond to positions of the categories, respectively.

In the present embodiment, each of the data Xj1 to Xjn input to the input layer corresponds to the representative value of each item (FIG. 4) of the operation data for each of the categories. Nodes in the input layer are connected to nodes in the output layer via weighting coefficients mi1 to min, separately. FIG. 9 only shows a connection relationship between each of the input data in the input layer and an ith node in the output layer in order to avoid complication of the drawing.

Next, an algorithm of the self-organizing map will be described. In the self-organizing map, n-dimensional data is mapped to the output layer by the following three steps (1) to (3).

Step (1)

A weighting coefficient vector mc is searched out from weighting coefficient vectors mi of all the nodes in the output layer, and the node corresponding to mc is considered as a winner. The weighting coefficient vector mc is most similar to a weighting coefficient vector based on the weighting coefficients mi1 to min of the input data. The weighting coefficient vector is also referred to as "reference vector".

Step (2)

The weighting coefficient vector mi of the winner node and the node in proximity thereof are updated so as to be close to the weighting coefficient vector based on the weighting coefficients mi1 to min of the input data.

Step (3)

The steps (1) and (2) are repeated every time the input data is given.

An initial value of the weighting coefficient vector min is determined by generating a random number. After that, by steps (1) to (3), nodes arranged close to each other in the output layer have similar weighting coefficient vectors, and nodes arranged far away from each other in the output layer have different weighting coefficient vectors. Therefore, the n-dimensional data can be mapped to the two-dimensional space by arranging the data (Xj1 to Xjn) input to the input layer at a position of a node closest to the weighting coefficient vector of the output layer.

In the present embodiment, the self-organizing map is adopted as a mapping method in the classification result display processing unit 204. Alternatively, the method of mapping multidimensional data is not limited to the self-organizing map, and other methods such as multidimensional scaling may be used. The multidimensional scaling is a method of arranging data having affinity in two-dimensional or three-dimensional space. The affinity of the data can be converted into similarity or a distance between objects to be classified. In the multidimensional scaling, similar objects to be classified are arranged close to each other, and different objects to be classified are arranged far away from each other.

[Example of Mapping to Two-Dimensional Space]

FIG. 10 shows an example in which a category number according to the first embodiment is mapped to two-dimensional space.

The number shown in two-dimensional space 61 in FIG. 10 is the category number, and the category number is mapped based on the representative value of each item of the operation data contained in each of the categories. Therefore, it can be seen from the drawing that, for example, a category 3 is close to a category 4 and a category 5, and is also close to a category 9. In addition, a category 7 and a category 8 are close in number. However, it can be seen that the category 7 is significantly separated from the category 8 in space (Euclidean Distance).

The description will now return to the flow chart in FIG. 8. In step S3, the classification result display processing unit 204 creates a three-dimensional graph in which the two-dimensional category number mapped in step S2 is shown on an XY plane formed of an X-axis and a Y-axis, and the representative value of the evaluation index calculated by the evaluation index calculation unit 203 is shown on a Z-axis. An example of the created three-dimensional graph is shown in FIG. 11.

[Three-Dimensional Display of Category Number and Evaluation Index]

FIG. 11 shows an example of a three-dimensional graph showing a relationship between the evaluation index and the category number according to the first embodiment.

An XY plane including an X-axis (first axis) and a Y-axis (second axis) shows an example of mapping the relationship between the similarity of categories shown in FIG. 10. The XY plane has 4×4 dots and the classified category is drawn on any one of the dots in the present embodiment. However, the present embodiment is not limited to this example. The evaluation index on a Z-axis (third axis) is a yield of a product, and is a value between 0.9 and 1.0 in the present embodiment. For example, a correspondence between the representative value of the evaluation index and the category number according to the present embodiment is as follows. In the following descriptions, the representative value of the evaluation index of each of the categories may be referred to as "evaluation value".

Number 1: 0.97; Number 2: 0.93; Number 3: 0.92; Number 4: 0.94; Number 5: 0.92; Number 6: 0.98; Number 7: 1.00; Number 8: 0.91; Number 9: 1.00; Number 10: 0.99.

According to a three-dimensional graph 62 as shown in FIG. 11, relationships among categories (plant states) are clarified, and a position of a category with a high evaluation index can be visualized. For example, when the category of the current operation data is number 4, the surveillance staff can intuitively understand that the evaluation index increases when the plant is operated so as to fall into a category 1, a category 6 or a category 9, and conversely, the evaluation index decreases when the state of the category 3 is approached.

Effects of First Embodiment

According to the first embodiment including the above-described configurations, the relationships among the categories classifying states of multidimensional operation data of the plant 10 are clarified. In addition, the relationship between the category and the evaluation index can be displayed in combination. Therefore, the surveillance staff can easily decide the operation method of improving the evaluation index of the plant 10.

For example, the surveillance staff sees the relationship between the category number and the evaluation index shown in FIG. 11, and selects a category number, which has an evaluation index higher than that of the current category, by the operation unit 31. On the basis of the category number received by the operation unit 31, the control device 30 refers to an operation table (not shown) and determines operation amounts and setting values (for example, flow rate) of machines (for example, the valve shown in FIG. 3) of the plant 10.

For example, the nonvolatile storage 57 stores the operation table (not shown) in which corresponding relationships among the category number, operation amount data, and setting value data are registered. The control device 30 compares the operation amount data and the setting value data of the current category with those of the selected category, and operates the plant 10 based on a difference of the operation amount data and a difference of setting value data.

Here, the surveillance staff is desirable to select the number of categories located at a position close to the category of the current number when the surveillance staff sees the relationship between the category number and the evaluation index shown in FIG. 11 and selects a category number having an evaluation index higher than that of the current category. The plant 10 transitions from the current state to a state close thereto and the evaluation index of the plant 10 is improved by selecting the category close to the current category. Therefore, it is possible to transition to a state with high efficiency.

In addition, it is assumed that there are a first category number, which has a slightly larger evaluation value and is located close to a certain category number, and a second category number, which has a larger evaluation value than the first category number and is located at a position more distant from the certain category number than the first category number. In this case, the surveillance staff can also confirm the relationship between the category number and the evaluation index in the three-dimensional graph, and select the second category located at a more distant position.

In the three-dimensional graph 62 in FIG. 11, evaluation values of adjacent category numbers are consecutive (connected). Alternatively, representative values of the evaluation indexes may be discretely displayed according to positions of categories by using a columnar graph.

As shown in FIG. 11, evaluation values of categories are displayed consecutively when evaluation values (discrete values) of adjacent categories are smoothly connected by adding values, which are calculated by using several methods such as linear interpolation, between the categories. Therefore, it is easier to understand the relationship between evaluation values of the categories. In other words, the surveillance staff can more easily recognize a difference in states between the categories intuitively by displaying an angle of a slope in addition to magnitude (height of the mountain) of an evaluation value.

2. Second Embodiment

A second embodiment is an example in which the classification result display processing unit 204 of the plant control system 40 (FIG. 2) maps category numbers to two-dimensional or three-dimensional space, and changes and displays colors of the mapped categories in accordance with representative values of evaluation indexes. Processing of the classification result display processing unit 204 will be mainly described below.

FIG. 12 is a flow chart showing processing of the classification result display processing unit 204 according to the second embodiment.

In step S11 which is identical to the step S1 of the first embodiment, the classification result display processing unit 204 calculates, based on operation data contained in each of the categories classified by the data classification unit 202, a representative value of the operation data and an evaluation index for each of the categories.

Next, in step S12, the representative value of each item of the operation data contained in each of the categories is mapped to two-dimensional space (two-dimensional space 61 in FIG. 10) or three-dimensional space in accordance with similarity between representative values, which are calculated in the step S11, of items in the operation data of categories. Similar to the first embodiment, a self-organizing map is used as a method of mapping a representative value of operation data.

Next, in step S13, the category numbers mapped in the step S12 or a region containing the category numbers are divided by color in accordance with the representative value of the operation data. That is, in the first embodiment, a relationship between a category number and an evaluation index was displayed by changing a value of a Z coordinate in accordance with a representative value of the evaluation index. However, in the second embodiment, a relationship between a category number and an evaluation index is displayed by a color difference. Alternatively, the relationship between the category number and the evaluation index may be displayed by a shade. Here, an example of mapping a category number to three-dimensional space is shown in FIG. 13.

[Example of Mapping to Three-Dimensional Space]

FIG. 13 shows an example in which the category numbers according to the second embodiment are mapped to three-dimensional space. That is, FIG. 13 shows an example in which a node of an output layer in FIG. 9 is three-dimensional.

Numbers shown in three-dimensional space 71 in FIG. 13 are the category numbers. The mapping example in FIG. 13 and the mapping example in FIG. 10 use the same operation data.

In FIG. 13, positional relationships among categories may be further easily represented by changing magnitude of the category numbers. For example, a category number may be smaller as the category number is closer to an origin of an X-axis, a Y-axis and an Z-axis, and the category number may be larger as the category number is relatively distant from the origin. Alternatively, the category number may be surrounded by a circle (sphere) as shown in FIG. 15, and a distance may be expressed by magnitude of a diameter of the circle. In addition, the category number may be surrounded by a quadrangle or other shapes.

The positional relationships among categories can be expressed more accurately when multidimensional data is mapped to the three-dimensional space, compared with a case where the multidimensional data is mapped to the two-dimensional space. However, visibility of the category number is better in the case where the multidimensional data is mapped to the two-dimensional space. For example, the classification result display processing unit 204 can improve the visibility by moving a viewpoint relative to the three-dimensional space 71 (rotating the three-dimensional space 71) based on an instruction from the operation unit 31.

[Two-Dimensional Color Coding Example]

FIG. 14 shows an example in which a color of a category number mapped to the two-dimensional space (FIG. 10) is changed in accordance with the representative value of the evaluation index. In FIG. 14, differences in color are indicated by shades due to restrictions of the drawings.

In the two-dimensional graph 72 shown in FIG. 14, the evaluation index is higher as the color of the category number is lighter, and the evaluation index is lower as the color of the category number is darker. It can be read from FIG. 14 that, the evaluation indexes of categories 7, 9, and 10 are the highest, the evaluation indexes of categories 1 and 6 are the second highest, the evaluation indexes of categories 2 and 4 are the third highest, and the evaluation indexes of categories 3, 5, and 8 are the lowest.

[Three-Dimensional Color Coding Example]

FIG. 15 shows an example in which a color of a category number mapped to the three-dimensional space (FIG. 13) is changed in accordance with the representative value of the evaluation index.

In a three-dimensional graph 73 shown in FIG. 15, similar to FIG. 14, the evaluation index is higher as the color is lighter, and the evaluation index is lower as the color is darker. Further, similar to FIG. 14, it can be read that the evaluation indexes of the categories 9, and 10 are the highest, the evaluation indexes of the categories 1 and 6 are the second highest, the evaluation indexes of the categories 2 and 4 are the third highest, and the evaluation indexes of the categories 3, 5, and 8 are the lowest.

According to the second embodiment including the above-described configuration, a position of a category having a high evaluation index and the relationship between the categories can be visualized, similar to FIG. 11, by applying a color or shade to a category number (a circle or a sphere surrounding a number). Therefore, similar to the first embodiment, a surveillance staff can decide a guideline for changing a state of the plant 10 from a current state of the plant 10 to a state where the value of the evaluation index is higher.

3. Third Embodiment

A third embodiment is an example in which a relationship between a category number mapped to two-dimensional space and an evaluation index is graphed, in accordance with a representative value of the evaluation index, by using a contour line.

FIRST EXAMPLE

FIG. 16 is an example in which the relationship between the evaluation index and the category number mapped to the two-dimensional space according to the first example of the third embodiment is shown, in accordance with a representative value of the evaluation index, by using the contour line.

A two-dimensional graph 81 in FIG. 16 shows representative values of evaluation indexes of categories in the two-dimensional space 61 shown in FIG. 10, by using the contour line. It can also be seen from FIG. 16 that, evaluation indexes of categories 1, 7, and 10 are the highest, evaluation indexes of categories 6 and 9 are the second highest, evaluation indexes of categories 2 and 4 are the third highest, and evaluation indexes of categories 3, 5, and 8 are the lowest.

SECOND EXAMPLE

FIG. 17 is an example in which the relationship between the evaluation index and the category number mapped to the two-dimensional space according to the second example of the third embodiment is shown by using contour information shown in accordance with the representative value of the evaluation index. The contour information in the present embodiment includes information (color and shade) showing the same evaluation value.

A two-dimensional graph 82 in FIG. 17 shows contours of evaluation indexes of category numbers mapped to the two-dimensional space on the basis of certain operation data by color (shade). Since magnitude of an evaluation index value can be confirmed by color and shade in a display mode of FIG. 17, the magnitude of the evaluation index value can be easily determined instantly as compared with a display mode of FIG. 16. The two-dimensional graph 82 in FIG. 17 is also a modification of the two-dimensional graph 72 in FIG. 14.

4. Fourth Embodiment

A fourth embodiment is an example in which a diagram (three-dimensional graph) of a relationship between a category number in three-dimensional display and an evaluation index can be switched to a diagram (two-dimensional graph) of the relationship between the category number in two-dimensional display and the evaluation index.

FIG. 18 shows a configuration example of a plant control system 40A including a data display processing device 20A according to the fourth embodiment.

A classification result display processing unit 204A of the data display processing device 20A receives a switching signal from the operation unit 31, and switches between a three-dimensional graph (a first display image 205a) and a two-dimensional graph (a second display image 205b). The three-dimensional graph is, for example, the graphs shown in FIGS. 11 and 15. In addition, the two-dimensional graph is, for example, the graphs shown in FIGS. 14, 16 and 17.

The classification result display processing unit 204A creates a two-dimensional graph and a three-dimensional graph during operation of the plant 10, and stores the respective image data in a built-in memory, the nonvolatile storage 57 or the like. The classification result display processing unit 204A outputs image data of an initial setting graph to the display unit 21, and switches to image data of other graphs and outputs the image data to the display unit 21 when receiving a switching instruction.

Alternatively, the classification result display processing unit 204A may create one of the two-dimensional graph and the three-dimensional graph in initial setting, and may create other graphs and output image data thereof to the display unit 21 when receiving a switching instruction.

According to the fourth embodiment including the above-described configuration, the classification result display processing unit 204A can switch, based on an instruction from the operation unit 31, between the two-dimensional graph and the three-dimensional graph. As described above, in two-dimensional space and three-dimensional space, positional relationships among categories can be more accurately represented in the three-dimensional space. However, visibility of the category number is better in the two-dimensional space. Therefore, a surveillance staff can improve the visibility and acquire information on a category number of interest by switching between the two-dimensional graph and the three-dimensional graph.

5. Fifth Embodiment

In the first to fourth embodiments, a category number located at a center of the two-dimensional space (output layer) is not particularly specified when the category number is mapped to the two-dimensional space (FIG. 10). In the fifth embodiment, a category number of interest (designated or current category number) is mapped so as to be located at a center of the two-dimensional space.

For example, a similarity relationship between categories 4 and 9 close to a category 7 and the category 7 is maintained in the two-dimensional space 61 in FIG. 10. However, a relationship between the category 7 and a category 10 is not exactly known.

FIG. 19 shows an example in which a designated category number according to the fifth embodiment is mapped to a center of two-dimensional space. In the example of FIG. 19, the category number 7 is designated to be located at the center of two-dimensional space 91 based on the same operation data as that in FIG. 10.

For example, a specific category number is set to be located in middle of each dimension in consideration of magnitude (length) of each dimension of the output layer (FIG. 9). Consequently, the specific category number can be arranged at the center (central part) of the output layer, and each category number can be mapped to a position according to similarity.

It can be seen that the category number 4 and the category number 9 are located close to the category number 7, and the similarity between the category number 7 and the category numbers 4 and 9 is high. Further, it can be seen that the category number 10 has a similarity to the category number 7 compared with a relationship therebetween in the mapping example in FIG. 10.

The categories, into which data of the plant 10 is classified, change when the plant 10 is in operation. Therefore, the category numbers may be mapped, so that a category into which current (or most recent) data of the plant 10 is classified is located at the center of the two-dimensional space (output layer).

In this manner, image data of mapping data (relationship between categories) based on a latest category is created/displayed when the current state of the plant 10 changes. Accordingly, a relationship between the latest category is accurately expressed. Therefore, by redisplaying the category number classified from the current data of the plant 10 so as to locate the category number at the center of the two-dimensional space, it is easy to intuitively understand to which state the plant should be operated from the current state.

The concept according to the fifth embodiment may be applied to the mapping to three-dimensional space.

6. Other Embodiments

In the first example (FIG. 16) according to the above-described third embodiment, a color (shade) may be applied to a region corresponding to a representative value of the same evaluation index and may be displayed therein, to form a drawing such as a color contour map. Accordingly, the visibility of a relationship between the evaluation indexes of the categories is further improved.

In addition, the classification result display processing unit 204A is formed to switch between the two-dimensional graph and the three-dimensional graph in the fourth embodiment. Alternatively, it may be formed to switch between a three-dimensional graph (FIG. 11) and a graph with a color (shade) (FIGS. 14 and 15). With such a configuration, a graph according to a preference of a surveillance staff can be displayed, thereby improving convenience.

In addition, the data display processing device 20 in FIG. 2 and the data display processing device 20A in FIG. 18 include the evaluation index calculation unit 203. However, the invention is not limited to this example. A representative value of an evaluation index of each of the categories may be stored in the operation data database 201, and the representative value of the evaluation index stored in the operation data database 201 may be input to the classification result display processing unit 204. Alternatively, the operation data database 201 may have a function of calculating the representative value of the evaluation index of each of the categories.

In addition, the control device 30 monitors and controls the plant 10 in FIGS. 1 and 18. Alternatively, the control device 30 may be formed to monitor and control a simulator.

Further, the invention is not limited to the above-described embodiments, and various other applications and modifications may be made without departing from the scope of the invention as set forth in the claims.

For example, the above-described embodiments have described configurations of the device and the system in detail and specifically for easy understanding of the invention, and are not necessarily limited to those including all the configurations described above. In addition, a part of a configuration of a certain embodiment can be replaced with a configuration of other embodiments. A configuration of other embodiments may be added to a configuration of a certain embodiment. Other configurations may be added to, deleted from or replaced with a part of a configuration of each embodiment.

In addition, the configurations, functions, processing units, processing means, or the like may be achieved by hardware by means of designing a part or all of them with, for example, an integrated circuit. The configurations, functions, or the like maybe achieved by software by means of interpreting and executing a program, by a processor, for achieving the respective functions. Information such as a program, a table, and a file for achieving the functions can be stored in a recording device such as a memory, a hard disk and a solid state drive (SSD), or a recording medium such as an IC card, an SD card, and a DVD.

In addition, a control line and an information line are shown in consideration of necessity for description, and not all control lines and information lines are necessarily shown in the device. In practice, it may be considered that almost all the configurations are connected with each other.

In addition, in the present description, a processing step that describes time-series processing includes processing performed in time series according to a described order, and also includes processing executed in parallel or individually (for example, parallel processing or processing by an object), which is not necessarily performed in time series.

REFERENCE SIGN LIST

10: plant 20: data display processing device 21: display unit 30: control device 31: operation unit 40: plant control system 50: computer 51: CPU 61: two-dimensional space 62: three-dimensional graph 71: three-dimensional space 72: two-dimensional graph 73: three-dimensional graph 81: two-dimensional graph 82: two-dimensional graph 91: two-dimensional plane 201: operation data database 201a: operation data 202: data classification unit 203: evaluation index calculation unit 203a: evaluation index data 204: classification result display processing unit 205a: first display image 205b: second display image.

The invention claimed is:

1. A plant data display processing device comprising:
   an operation data database that stores plant operation data, the operation data comprising multidimensional operation data that is time series measurement data obtained from a plurality of sensors of the plant for a plurality of time points, each time point corresponding to measurement data obtained from each of the plurality of sensors for the respective time point;

at least one memory configured to store program code of software; and a central processing unit (CPU) coupled to the at least one memory, the CPU configured to execute the program code stored in the memory to:

classify the multidimensional operation data for each time point acquired from the operation data database into a plurality of categories according to similarity thereof, and outputs the plurality of categories as classification results;

calculate evaluation indexes of the plurality of categories from a value of the multidimensional operation data for each time point stored in the operation data database, wherein the evaluation indexes are yields at each time point; and calculate a representative value of the multidimensional operation data for each of the categories from the multidimensional operation data contained in each of the categories;

map identification information of each of the categories to two-dimensional space in accordance with similarity of the representative value of the operation data; and generate three-dimensional image data in which the mapped identification information of the categories is shown on a plane formed of a first axis and a second axis, and the evaluation indexes of the categories are shown on a third axis, wherein identification information for categories having greater similarity are shown closer to each other along the first axis and second axis than identification information for categories having lower similarity; and generate image data in which contour lines show relationships between the evaluation indexes and the mapped identification information in accordance with representative values of the evaluation indexes of the categories.

2. The plant data display processing device according to claim 1, wherein the CPU is further configured to:

calculate a representative value of the operation data for each of the categories from the operation data corresponding to each of the categories; and map, in accordance with similarity of the representative value of the operation data, identification information of each of the categories to two-dimensional space, so as to set identification information of a designated category at a center of a display position.

3. The plant data display processing device according to claim 1, wherein the CPU is further configured to:

calculate a representative value of the operation data for each of the categories from the operation data corresponding to each of the categories; and map, in accordance with similarity of the representative value of the operation data, identification information of each of the categories to two-dimensional space, so as to set identification information of a category, into which current operation data of a plant is classified, at a center of a display position.

4. The plant data display processing device according to claim 1, wherein a method of mapping the identification information of the category by the classification result display processing unit is a self-organizing map or multidimensional scaling.

5. A plant control system comprising:

the plant data display processing device according to claim 1;

wherein the CPU is further configured to:
receive input operation and output an operation signal according to the input operation; and
control a plant based on the operation signal input.

6. A plant data display processing device comprising:

an operation data database that stores plant operation data, the operation data comprising multidimensional operation data that is time series measurement data obtained from a plurality of sensors of the plant for a plurality of time points, each time point corresponding to measurement data obtained from each of the plurality of sensors for the respective time point;

at least one memory configured to store program code of software; and a central processing unit (CPU) coupled to the at least one memory, the CPU configured to execute the program code stored in the memory to:

classify the multidimensional operation data for each time point acquired from the operation data database into a plurality of categories according to similarity thereof, and outputs the plurality of categories as classification results;

calculate evaluation indexes of the plurality of categories from a value of the multidimensional operation data for each time point stored in the operation data database, wherein the evaluation indexes are yields at each time point; and calculate a representative value of the multidimensional operation data for each of the categories from the multidimensional operation data contained in each of the categories;

map identification information of each of the categories to two-dimensional or three-dimensional space in accordance with similarity of the representative value of the operation data; and generate image data in which a color or shade of the mapped identification information of each of the categories is changed in accordance with representative values of the evaluation indexes of the categories and in which identification information for categories having greater similarity are shown closer to each other than identification information for categories having lower similarity; and generate image data in which contour lines show relationships between the evaluation indexes and the mapped identification information in accordance with representative values of the evaluation indexes of the categories.

7. The plant data display processing device according to claim 6, wherein the CPU is further configured to:

calculate a representative value of the operation data for each of the categories from the operation data corresponding to each of the categories; and map, in accordance with similarity of the representative value of the operation data, identification information of each of the categories to two-dimensional or three-dimensional space, so as to set identification information of a designated category at a center of a display position.

8. The plant data display processing device according to claim 6, wherein the CPU is further configured to:

calculate a representative value of the operation data for each of the categories from the operation data corresponding to each of the categories; and map, in accordance with similarity of the representative value of the operation data, identification information of each of the categories to two-dimensional or three-dimensional space, so as to set identification information of a category, into which current operation data of the plant is classified, at a center of a display position.

* * * * *